Aug. 14, 1945.　　　D. K. FERRIS　　　2,381,894
DOMESTIC APPLIANCE
Filed Aug. 30, 1941　　　2 Sheets-Sheet 1
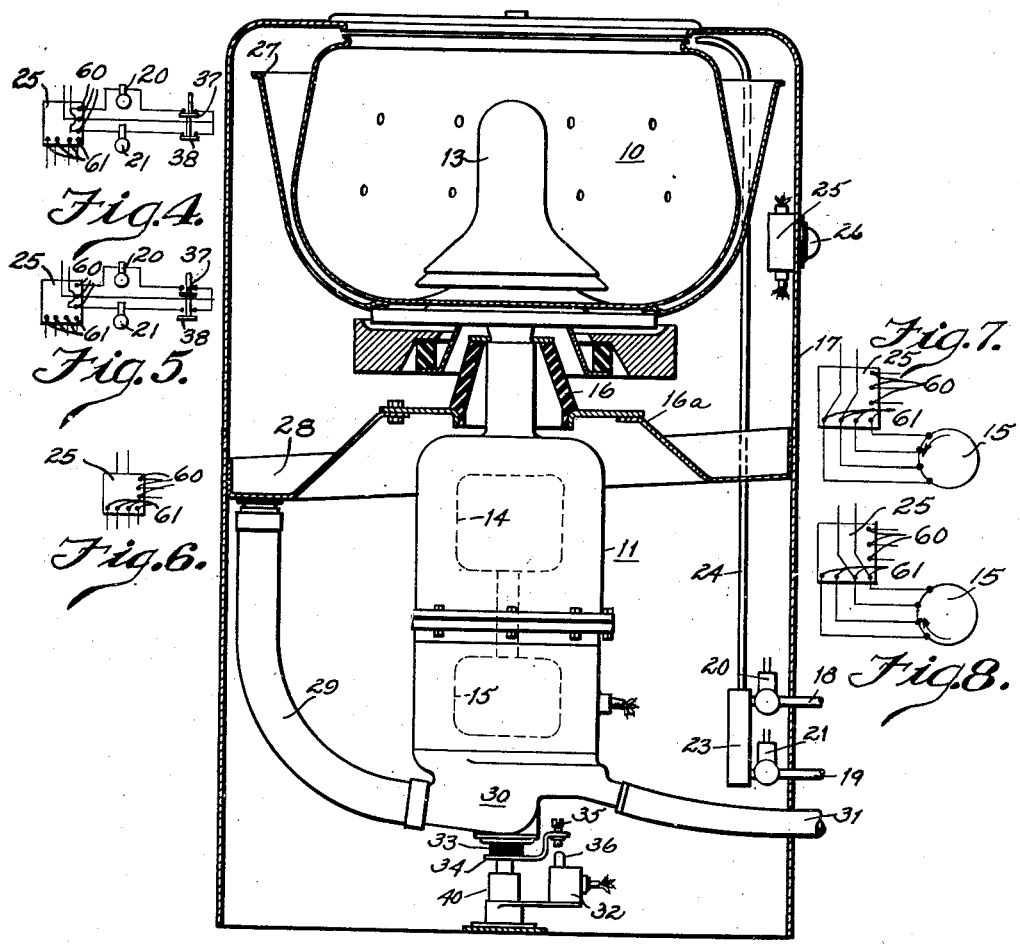
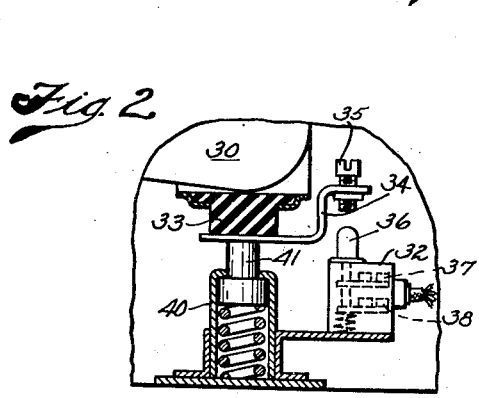
INVENTOR.
Donald K. Ferris Aug. 14, 1945.   D. K. FERRIS   2,381,894
DOMESTIC APPLIANCE
Filed Aug. 30, 1941   2 Sheets-Sheet 2

INVENTOR.
Donald K. Ferris
BY
Spencer Hardman & Feder
Attorneys

Patented Aug. 14, 1945

2,381,894

UNITED STATES PATENT OFFICE 2,381,894

DOMESTIC APPLIANCE

Donald K. Ferris, Dayton, Ohio, assignor to General Motors Corporation, Dayton, Ohio, a corporation of Delaware Application August 30, 1941, Serial No. 409,070

3 Claims. (Cl. 68—12)

This invention relates to domestic appliances and more particularly to washing machines.

An object of this invention is to provide a control for a washing machine which is responsive to the weight of material added to the washing machine.

Further objects and advantages of the present invention will be apparent from the description, reference being had to the accompanying drawings, wherein a preferred form of the present invention is clearly shown.

In the drawings:

Fig. 1 is a vertical cross-section, somewhat diagrammatic, of a washing machine embodying my invention;

Fig. 2 is an enlarged cross-section of a portion of Fig. 1;

Fig. 3 is a wiring diagram showing a control for the washing machine; and

Figure 9:
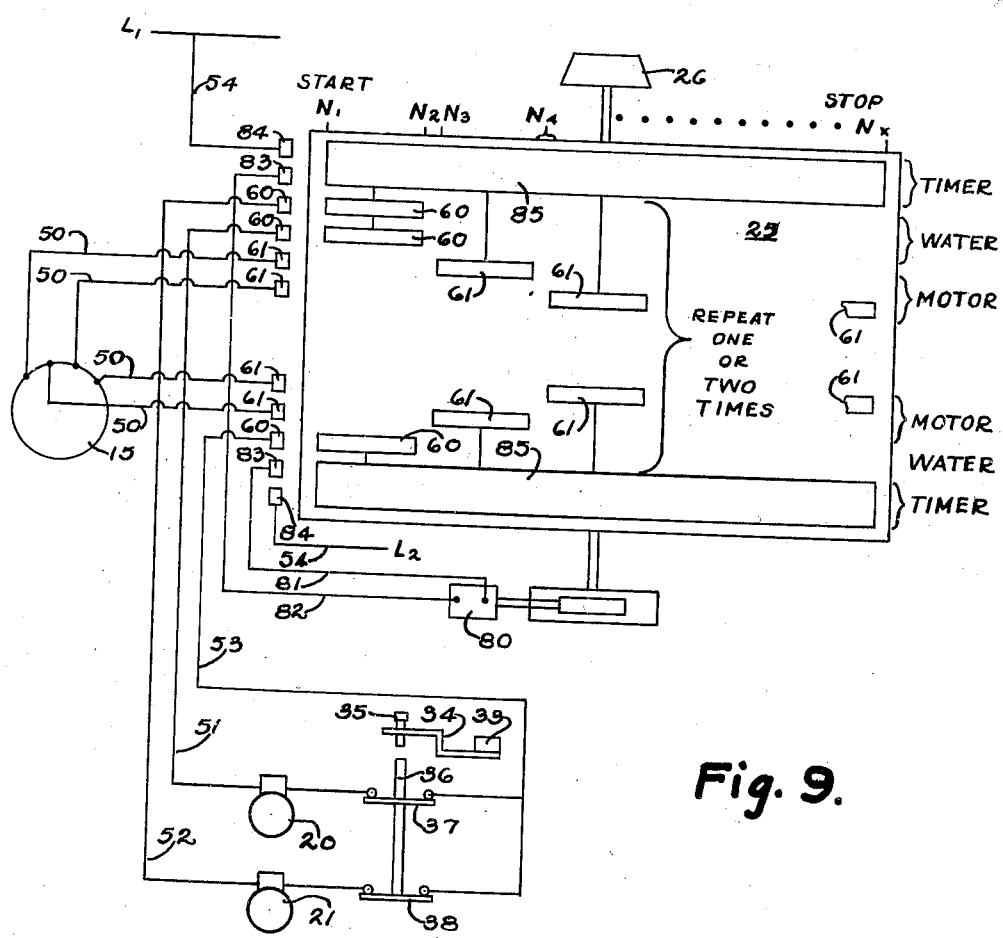

Figs. 4 to 8 inclusive are wiring diagrams showing switch connections under different conditions.

Fig. 9 is a diagram of the electrical elements employed with my invention.

In general, the washing machine comprises a rotatable tub 10, an agitator 13, and a motor transmission housing 11, which contains a transmission 14 and a motor 15. The arrangement is such, that, when the motor 15 is rotated in one direction, the transmission 14 rotates the basket, and when the motor 15 is rotated in the opposite direction, the transmission 14 vertically reciprocates the agitator 13. The motor 15 and transmission 14 may be constructed as shown in Fig. 6 of Clark Patent No. 2,346,152 granted April 11, 1944, wherein Fig. 6 is reproduced from Clark application S. N. 358,871, filed September 28, 1940.

The basket 10 is supported on a resilient collar 16, made of rubber or the like, to allow the basket 10 and housing 11 to vibrate both during agitation and rotation relatively to the outer casing 17. The collar 16 is supported on the partition 16a rigidly secured to casing 17.

Means are provided for filling the tub 10 with liquid from a source of liquid supply. For this purpose, hot and cold water connections 18 and 19 are provided. These connections have solenoid valves 20 and 21, respectively, which are connected to a mixing chamber 23 and conduit means 24 for discharging the liquid into the basket 10. A timer switch mechanism 25, of well-known construction, is mounted in the washing machine, and is provided with a handle 26. The user may place the handle 26 at the starting position N₁, whereupon the timer is driven by an electric clock 80 or the like, which is energized by lines 81 and 82 from contacts 83, 84 and 85, which timer opens and closes certain switch contacts 60 and 61 in sequence as indicated in Fig. 9, to cause the washing machine to perform the desired operations. For example, when the timer is started, at N₁ the switches 60 therein are moved to energize and open solenoid valves 20 and 21 for a period of time more than sufficient to fill the basket 10 with water. Thereafter, at N₂, the timer 25 opens switches 60 and closes the solenoid valves 20, 21, and, at N₃, closes certain switches 61 and energizes the motor 15 to rotate in the direction which imparts agitation to the agitator 13 for a proper length of time. Thereafter, at N₄, the direction of rotation of the motor 15 is reversed by opening certain switches 61 and closing other switches 61 to impart a spinning action to the basket 10. This causes the liquid therein to be discharged over the lip 27 into the sump 28 from whence the liquid flows through pipe 29 under the impulse of pump 30 to be discharged through the pipe 31 into the suitable sink or drain.

In accordance with this invention, the valves 20 and 21 tend to remain open under the control of the timer 25 for a much longer period of time than is necessary to fill the tub. I provide switch means, responsive to weight of the material in tub 10 to close the valves 20 and 21, before they would otherwise be closed by the timer 25. Inasmuch as a tub of this character has substantially about 8 pounds of clothes and about 60 pounds of water, the weight responsive switch 32 may be set to close the valves 20 and 21 whenever the combined weight of the material in tub 10 reaches 68 pounds or any other selected weight. Any change in the weight of the clothes placed in the basket 10 may vary this total weight a slight amount, but not enough to cause any great difference in the level of liquid in tub 10 controlled in response to the weight of material in the tub. When less than 8 pounds of clothes are placed in the tub, more water is introduced into the tub; but the final level of the water is practically the same because the smaller amount of clothes counterbalances the additional amount of water. Any slight difference is immaterial.

The switch 32 may be of the snap-acting type, if desired. The lower end 33 of the housing 11 cooperates with an arm 34 and an adjustment screw 35. As the arm 34 descends, in response to the filling action taking place in the tub 10, it impinges upon the plunger 36 and opens the switches 37 and 38, which cause the solenoid valves 20 and 21 to close.

The construction of the weight responsive switch means may be of any suitable type. For example, a vertical cylindrical housing 40, mounted on the frame or outer casing 17, may be provided with a spring-pressed plunger 41 extending toward the tub. This plunger may carry the arm 34. The lower end 33 of the housing 11 may be a rubber block which rests on the arm 34 (the arm 34 being in the form of a large disc). This permits the housing 11 to move laterally with respect to the arm 34, without displacing the screw 35 from alignment with the plunger 36. If desired, the rubber block 33 may be secured to both the casing 11 and to the arm 34, and in such case a limit is placed on the lateral rocking movement of the casing 11.

The timer 25 is provided with all the necessary leads to the controlled parts of the washing machine. For example, it is provided with the electrical leads 50 extending to the motor 15. Certain of these leads are energized when the motor is to be rotated in one direction and certain other of such leads 50 are energized when the motor is to be rotated in the opposite direction. Leads 51 and 52 may be connected to the solenoid valves 20 and 21 and to the switches 37 and 38 respectively, being connected to the common return line 53. The leads 54 are connected to a suitable source of electric power $L_1$ and $L_2$.

In the operation of the machine, clothes are placed in the tub 10, together with a sufficient amount of soap. The timer 25 is set at its starting position $N_1$, whereupon the timer 25 closes switches 60 and opens either the valve 20 or valve 21 or both as shown in Fig. 4. This causes liquid to be discharged from either or both the connections 18 and 19 through the conduit 24 into the tub 10. The filling operation continues until the combined weight of the water and clothes reaches a predetermined maximum (adjustable by the screw 35), whereupon the switches 37 and 38 are opened in response to the weight of the material in the tub 10 as shown in Fig. 5. This closes the valves 20 and 21 and stops the filling operation of the tub. Thereafter, at $N_2$, the timer 25 changes the electrical connections to these valves 20 and 21 by opening switches 60, independently of switches 37 and 38, so that the valves cannot be opened even if the switches 37 and 38 should be closed as shown in Fig. 6. Thereafter, at $N_3$, certain switches 61 are closed and the motor 15 is energized to agitate the clothes, under the control of the timer 25 as shown in Fig. 7. Thereafter, at $N_4$, certain switches 61 are closed and others opened to reverse the motor so that the tub 10 is rotated by reversing the motor 15, also under the control of timer 25 as shown in Fig. 8. One or two rinsing operations may be further performed, which are duplicates of the foregoing sequences, with the exception that soap is not generally added to the water, thus suitably rinsing the clothes in the basket. In each rinsing sequence the filling operation is controlled in response to combined weight of the clothes and liquid in the same manner as described with respect to the initial washing operation.

While the form of embodiment of the invention as herein disclosed, constitutes a preferred form, it is to be understood that other forms might be adopted, all coming within the scope of the claims which follow:

What is claimed is as follows:

1. In combination, a washing machine including a resiliently supported rotatable basket, agitating means in said basket, a source of liquid supply for said basket, valve means controlling the flow of liquid from said source to said basket, a timer controlling a sequence of operations of said washing machine, means under the control of said timer for preventing rotation of said basket and agitation by said agitating means during a filling period, means under the control of said timer tending to maintain said valve means open during said filling period, means responsive to the downward movement of said basket under weight of liquid added to said basket closing said valve means when said basket is filled to a predetermined amount, means under the control of said timer maintaining said valve means closed after said filling period, and means under the control of said timer causing agitation by said agitating means and rotation of said basket after said filling period.

2. In combination, a washing machine including a resiliently supported rotatable basket, agitating means in said basket, an electric motor and transmission means connected to said basket and agitating means, a liquid source of supply for said basket, solenoid valve means controlling the flow of liquid from said liquid source to said basket, an electric power source, a timer controlling the flow of electrical power from said electric power source, first switch means operated by said timer controlling rotation of said motor and transmission means, second switch means operated by said timer in an electric circuit from said power source to said solenoid valve means, third switch means in said electric circuit responsive to downward movement of said basket under the weight of liquid added to said basket, means operated by said timer during a filling period and acting on said first and second switch means to prevent rotation of said basket and agitation by said agitating means and, in cooperation with said third switch means opening said solenoid valve means to cause flow of liquid into said basket while said basket does not contain a predetermined amount of liquid, means operated by downward movement of said basket and acting on said third switch means to close said solenoid valve means when said basket is filled to contain a predetermined amount of liquid, means operated by said timer actuating said second switch means after said filling period to maintain said solenoid valve means closed independently of said third switch means, and means operated by said timer actuating said first switch means after said filling period to cause agitation of said agitating means and rotation of said basket.

3. In combination, a washing machine including a resiliently supported rotatable basket, agitating means in said basket, a liquid source of supply for said basket, solenoid valve means controlling the flow of liquid from said liquid source to said basket, an electric power source, a timer controlling the flow of electrical power from said electric power source, first switch means operated by said timer preventing rotation of said basket and agitation by said agitating means during a filling period, second switch means operated by said timer tending to maintain said solenoid valve means open during said filling period, third switch means responsive to the downward movement of said basket under the weight of liquid added to said basket cooperating with said second switch means to open said solenoid valve means when said basket does not contain a predetermined amount of liquid and closing said solenoid valve means when said basket contains said predetermined amount of liquid, means operated by said timer actuating said second switch means to maintain said solenoid valve means closed after said filling period, and means operated by said timer actuating said first switch means to cause agitation by said agitating means and rotation of said basket after said filling period.

DONALD K. FERRIS.